(12) United States Patent
Meyer

(10) Patent No.: US 11,357,247 B2
(45) Date of Patent: Jun. 14, 2022

(54) ALL-NATURAL, HEAT AND FREEZE-THAW STABLE MAYONNAISE FOOD PRODUCT

(71) Applicant: Texas Tech University System, Lubbock, TX (US)

(72) Inventor: Richard S. Meyer, Harrison, ID (US)

(73) Assignee: Texas Tech University System, Lubbock, TX (US)

( * ) Notice: Subject to any disclaimer, the term of this patent is extended or adjusted under 35 U.S.C. 154(b) by 417 days.

(21) Appl. No.: 15/555,439

(22) PCT Filed: Mar. 3, 2016

(86) PCT No.: PCT/US2016/020651
§ 371 (c)(1),
(2) Date: Sep. 1, 2017

(87) PCT Pub. No.: WO2016/141164
PCT Pub. Date: Sep. 9, 2016

(65) Prior Publication Data
US 2018/0042282 A1 Feb. 15, 2018

Related U.S. Application Data

(60) Provisional application No. 62/128,344, filed on Mar. 4, 2015.

(51) Int. Cl.
| | | |
|---|---|---|
| *A23L 27/60* | (2016.01) | |
| *A23L 25/10* | (2016.01) | |
| *A23L 23/00* | (2016.01) | |
| *A23G 1/48* | (2006.01) | |
| *A23L 29/10* | (2016.01) | |
| *A23C 19/08* | (2006.01) | |
| *A23D 9/06* | (2006.01) | |
| *C11B 5/00* | (2006.01) | |
| *A23L 27/10* | (2016.01) | |
| *A23G 1/36* | (2006.01) | |
| *A23D 7/00* | (2006.01) | |
| *A23D 7/005* | (2006.01) | |
| *A23G 1/32* | (2006.01) | |

(52) U.S. Cl.
CPC .............. *A23L 27/60* (2016.08); *A23C 19/08* (2013.01); *A23D 7/003* (2013.01); *A23D 7/0053* (2013.01); *A23D 9/06* (2013.01); *A23G 1/32* (2013.01); *A23G 1/36* (2013.01); *A23G 1/48* (2013.01); *A23L 23/00* (2016.08); *A23L 25/10* (2016.08); *A23L 27/10* (2016.08); *A23L 29/10* (2016.08); *C11B 5/0085* (2013.01); *A23V 2002/00* (2013.01); *C11B 5/0035* (2013.01)

(58) Field of Classification Search
CPC .......... A23L 27/60; A23L 25/10; A23L 29/10; A23L 23/00; A23L 27/10; A23L 21/10; A23L 27/00; A23L 27/12; A23C 19/08; A23C 11/08; A23D 7/003; A23D 7/0053; A23D 9/06; A23G 1/32; A23G 1/36; A23G 1/48; A23G 1/56; C11B 5/0035; C11B 5/0085; C11B 5/0092; A23V 2002/00

USPC ......................................................... 426/601
See application file for complete search history.

(56) References Cited

U.S. PATENT DOCUMENTS

| | | |
|---|---|---|
| 1,395,934 A | 11/1921 | Stockton |
| 1,398,352 A | 11/1921 | Stockton |
| 2,944,906 A | 7/1960 | Spitzer et al. |
| 3,264,121 A | 8/1966 | Tuomy et al. |
| 3,542,565 A | 11/1970 | Stauffer et al. |
| 3,930,057 A | 12/1975 | Jokay |
| 4,105,461 A | 8/1978 | Racciato |
| 4,308,294 A | 12/1981 | Rispoli et al. |
| 4,913,921 A | 4/1990 | Schroeder et al. |
| 5,366,754 A | 11/1994 | Rudan et al. |
| 5,395,631 A | 3/1995 | Sweeney |
| 5,425,957 A | 6/1995 | Gaim-Marsoner et al. |
| 5,605,697 A * | 2/1997 | Asano ..................... A21D 2/14 424/439 |
| 5,958,498 A | 11/1999 | Trueck et al. |
| 6,423,363 B1 | 7/2002 | Traska et al. |
| 6,544,573 B1 | 4/2003 | Pajela et al. |
| 2005/0084471 A1 | 4/2005 | Andrews et al. |
| 2005/0244564 A1 | 11/2005 | Perlman |
| 2006/0216391 A1* | 9/2006 | Delsol .................. A23L 27/105 426/589 |
| 2008/0069928 A1* | 3/2008 | Moder ................... A21D 2/145 426/271 |

(Continued)

FOREIGN PATENT DOCUMENTS

| | | |
|---|---|---|
| CA | 2357861 A1 | 3/2002 |
| EP | 689773 A1 | 1/1996 |
| WO | 2014121141 A1 | 8/2014 |

OTHER PUBLICATIONS

NPL Ghosh et al. (in JAOCS vol. 73 (10) pp. 1271-1274, 1996). (Year: 1996).*

(Continued)

*Primary Examiner* — Bhaskar Mukhopadhyay
(74) *Attorney, Agent, or Firm* — Edwin S. Flores; Daniel J. Chalker; Chalker Flores, LLP

(57) ABSTRACT

An eggless mayo is provided that is heat stable or that is heat stable as well as freeze-thaw stable and that is all natural. In addition a mayonnaise composition is provided that has increased heat stability as well as freeze-thaw stability. A low-salt version of the eggless mayo is provided as well as compositions for various butters and creams that have enhanced heat stability as well as freeze-thaw stability.

9 Claims, 8 Drawing Sheets

(56) References Cited

U.S. PATENT DOCUMENTS

2008/0050494 A1    8/2008   Meyer

OTHER PUBLICATIONS

NPL Stephanie et al. (in Food Chemistry 102: 1208-1213, 2007). (Year: 2007).*
NPL Search using 'Google scholar' on High oleic Sunflower oil (Selected #2 reference from the search result, which is as showwn above Stephanie et al. 2007). (Year: 2007).*
Cleveland, Brady D. et al. "Effect of Natural Antioxidant Concentration on Lipid Oxidation of Ready-to-Eat Ground Beef Links from Cattle Fed Distillers Grains in Different Phases of Production" 2014 Nebraska Beef Cattle Report, p. 109-110.
International Search Report (PCT/US2016/020651) dated Jun. 10, 2016.
Kwan, L. et al. "Fractionation of Water-Soluble and -Insoluble Components from Egg Yolk with Minimum Use of Organic Solvents" J Food Sci 56(6), 1991, 1537-541.

* cited by examiner

| | Eggless Mayo-Heat Stable, freeze-thaw stable & all Natural | | Heat Stable, all natural | | Heat stable, freeze-thaw stable, all natural | | Heat stable, freeze-thaw stable, all natural | |
|---|---|---|---|---|---|---|---|---|
| | | | Eggless A version | | Eggless Improved | | butter spread | |
| | Figure 1 | | % | batch | B | C | | batch |
| Add | Pre-blend water soluble ingredients | | | 1000.00 | | | | 1000.000 |
| 1 | water, distilled, no minerals | | 15.781% | 157.81 | 14.556% | 13.864% | 13.864% | 138.640 |
| 2 | TIC | Ticaloid 1155 (Gum Arabic/guar/Xanthan Gum) 0.2 to 0.4% | | | 0.300% | 0.300% | 0.300% | 3.000 |
| 3 | HORN | Quillaja natural flavor | 1.000% | 10.00 | 1.000% | 1.000% | 1.000% | 10.000 |
| 4 | Heinz | white vinegar (50 grain) | 0.069% | 0.69 | 0.069% | 0.069% | 0.069% | 0.690 |
| 5 | | Lemon juice, natural strength, all natural | 0.092% | 0.92 | 0.092% | 0.092% | 0.092% | 0.920 |
| 6 | | salt | 0.825% | 8.25 | 0.825% | 0.825% | 0.825% | 8.250 |
| 7 | Ocean's flavor | sea salt # 68 | | | 0.825% | 0.825% | 0.825% | 8.250 |
| | | sugar | 1.468% | 14.68 | 1.468% | 0.000% | 0.000% | 0.000 |

*FIG. 1A*

Eggless Mayo-Heat Stable, freeze-thaw stable & all Natural

Figure 1

| | | Heat Stable, all natural | | Heat stable, freeze-thaw stable, all natural | | Heat stable, freeze-thaw stable, all natural | |
|---|---|---|---|---|---|---|---|
| | | Eggless A version | | Eggless Improved | | butter spread | |
| | | % | batch | B | C | % | batch |
| Add | Pre-blend water soluble ingredients | | 1000.00 | | | | 1000.000 |
| 8 | Agave Processor's Agave Premium Syrup (South Africa), very bland, 70 brix | | | | 2.160% | 2.160% | 21.600 |
| 9 | McCormick's mustard flour | 0.119% | 1.19 | 0.119% | 0.119% | 0.119% | 1.190 |
| 10 | PMP Fermentation gluconic acid (50%) | 0.917% | 9.36 | 0.917% | 0.917% | 0.917% | 9.170 |
| 11 | WTi Dry Vinegar | | | 0.100% | 0.100% | 0.100% | 1.000 |
| | Pre-blend oil, gums, flavor and antioxidants | | | | | | 0.000 |
| 12 | Ungerer nat. egg flavor F 14752 | 0.037% | 0.37 | 0.037% | 0.037% | 0.037% | 0.370 |
| | Cargill Clear valley High oleic sunflower oil | 79.500% | 795.00 | 79.500% | 79.500% | | 0.000 |
| | Kemin fortium: tocopherols MTD-10 (0.015% of oil) | 0.092% | 0.92 | 0.092% | 0.092% | 0.092% | 0.920 |
| | Kemin fortium: Rosemary & green tea extracts RGT12 plus dry (0.2% of product) | 0.100% | 0.92 | 0.100% | 0.100% | 0.100% | 1.000 |
| 12a | Clarified Butter/Ghee: (label: fresh pasteurized cream) www.worldgrocer.com | | | | | 79.500% | 795.000 |
| | aerate with nitrogen to improve spreadability | 80.765% | 807.76 | 80.865% | 83.025% | 83.025% | 830.250 |
| 1. blend water, vinegar, lemon juice, Quillaja, dry ingredients in a Cuisinart mixer | | | | | | | |
| 2. Slowly add the oil to generate a smooth, creamy emulsion. | | | | | | | |

*FIG. 1B*

| Eggless Mayonnaise--Heat Stable & all Natural | | | Heat stable Mayonnaise (egg) | Heat stable Mayonnaise (egg) | Heat stable, Freeze-thaw stable Mayonnaise (egg) | Heat stable, Freeze-thaw stable Mayonnaise (egg) |
|---|---|---|---|---|---|---|
| 10/5/2014 | | Figure 2 | MA | MB | MAF | MBF |
| Add | | Pre-blend water soluble ingredients | | | | |
| 1 | | water, distilled, no minerals | 11.781% | 13.781% | 11.481% | 13.481% |
| 2 | HORN | Quillaja natural flavor | 1.000% | 1.000% | 1.000% | 1.000% |
| 3 | Heinz | white vinegar (50 grain) | 0.069% | 0.069% | 0.069% | 0.069% |
| 4 | | Lemon juice, natural strength, all natural | 0.092% | 0.092% | 0.092% | 0.092% |
| 5 | TIC | Ticaloid 1155 (Gum Arabic/guar/Xanthan Gum) 0.2 to 0.4% | | | 0.300% | 0.300% |
| 6 | | salt | 0.825% | | 0.825% | |
| 6 | Ocean's flavor | sea salt # 68 | | 0.825% | | 0.825% |
| 7 | | sugar | 1.468% | 1.468% | 1.468% | 1.468% |
| 7 | Agave Processor's: | Agave Premium Syrup (South Africa), very bland | | | | |
| 8 | McCormick's | mustard flour | 0.119% | 0.119% | 0.119% | 0.119% |
| 9 | PMP Fermentation | gluconic acid (50%) | 0.917% | 0.917% | 0.917% | 0.917% |
| | | Pre-blend oil flavor and antioxidants | | | | |
| | Ungerer | nat. egg flavor F 14752 | 0.037% | 0.037% | 0.037% | 0.037% |
| | Cargill | High oleic sunflower oil | 79.500% | 79.500% | 79.500% | 79.500% |
| 10 | Kernin fortium: mixed tocopherols | MTD-10 (0.015% of oil) | 0.092% | 0.092% | 0.092% | 0.092% |
| | Kernin fortium: Rosemary & green tea extracts | RGT12 plus dry (0.2% of product) | 0.100% | 0.100% | 0.100% | 0.100% |
| 12 | | egg yolks | | | | |
| 13 | | whole eggs | 4.000% | 2.000% | 4.000% | 2.000% |
| 14 | | Ca EDTA (75 ppm) | | | | |
| | | | 100.000% | 100.000% | 100.000% | 100.000% |

1. blend water, vinegar, lemon juice, Quillaja, dry ingredients in a Cuisinart mixer with blade operating at high speed.
2. Slowly add the oil to generate a smooth, creamy emulsion.

*FIG. 2*

| Eggless Mayo--Heat Stable & all Natural | | Heat stable, freeze-thaw stable, all natural, 50% less sodium | | | |
|---|---|---|---|---|---|
| | Figure 3 | C-2 | | E | |
| 1/25/2015 best | | | Batch | | Batch |
| Add | Pre-blend water soluble ingredients | | 1000.00 | | 1000.00 |
| 1 | water, distilled, no minerals | 13.014% | 130.140 | 13.714% | 137.14 |
| 2 | TIC Ticaloid 1155 (Gum Arabic/guar/Xanthan Gum) 0.2 to 0.4% | 0.300% | 3.000 | 0.200% | 2.00 |
| 3 | HORN Quillaja natural flavor | 1.000% | 10.000 | 1.000% | 10.00 |
| 4 | Heinz white vinegar (50 grain) | 2.569% | 25.690 | 2.569% | 25.69 |
| 5 | Lemon juice, natural strength, all natural | 0.092% | 0.920 | 0.092% | 0.92 |
| 6 | salt | 0.625% | 6.250 | 0.325% | 3.25 |
| 7 | Ocean's flavor sea salt # 68 | 0.625% | 6.250 | 0.325% | 3.25 |
| 8 | Agave Processor's Agave Premium Syrup (South Africa), very bland | 2.160% | 21.600 | 2.160% | 21.60 |
| 9 | McCormick's Mayo mustard | 0.119% | 1.190 | 0.119% | 1.19 |
| 10 | PMP Fermentation gluconic acid (50%) | 0.717% | 7.170 | 0.717% | 7.17 |
| 11 | Kemin fortium: Rosemary & green tea extracts RGT12 plus dry (0.2% of product) | 0.100% | 1.000 | 0.100% | 1.00 |
| 12 | WTI Dry Vinegar | 0.050% | 0.500 | 0.050% | 0.50 |
| | Pre-blend oil, gums, flavor and antioxidants | | | | 0.00 |
| | Ungerer nat. egg flavor F 14752 | 0.037% | 0.370 | 0.037% | 0.37 |
| 13 | Cargill Clear valley High oleic sunflower oil | 78.500% | 785.000 | 78.500% | 785.00 |
| | Kemin fortium: tocopherols MTD-10 (0.015% of oil) | 0.092% | 0.920 | 0.092% | 0.92 |
| 14 | GNT Exberry natural Shade "Celestial yellow" # 474503 | | | | |
| 15 | GNT Exberry natural Shaded "Mango yellow" # 450005 | | | | |
| | | 100.000% | 1000.000 | 100.000% | 1000.00 |
| 1. blend water, vinegar, lemon juice, Quillaja, dry ingredients in a Cuisinart mixer with blade operating at high speed. | | | | | |
| 2. Slowly add the oil to generate a smooth, creamy emulsion. | | | | | |

*FIG. 3*

| | Eggless Mayo--Heat Stable & all Natural | Heat stable, freeze-thaw stable, 50% less sodium and all natural | | | |
|---|---|---|---|---|---|
| | Figure 4 | | Eggless Improved | | |
| | 1/25/2015 best | | B | | C |
| Add | | | Batch | | Batch |
| | Pre-blend water soluble ingredients | | 1000.00 | | 1000.00 |
| 1 | water, distilled, no minerals | 15.156% | 151.560 | 14.464% | 144.640 |
| 2 | TIC Ticaloid 1155 (Gum Arabic/guar/Xanthan Gum) 0.2 to 0.4% | 0.300% | 3.000 | 0.300% | 3.000 |
| 3 | HORN Quillaja natural flavor | 1.000% | 10.000 | 1.000% | 10.000 |
| 4 | Heinz white vinegar (50 grain) | 0.069% | 0.690 | 0.069% | 0.690 |
| 5 | Lemon juice, natural strength, all natural | 0.092% | 0.920 | 0.092% | 0.920 |
| 6 | salt | 0.625% | 6.250 | 0.625% | 6.250 |
| 7 | Ocean's flavor sea salt # 68 | 0.625% | 6.250 | 0.625% | 6.250 |
| 8 | sugar | 1.468% | 14.680 | 0.000% | 0.000 |
| 8 | Agave Processor's Agave Premium Syrup (South Africa), very bland | | 0.000 | 2.160% | 21.600 |
| 9 | McCormick's mustard flour | 0.119% | 1.190 | 0.119% | 1.190 |
| 10 | PMP Fermentation gluconic acid (50%) | 0.717% | 7.170 | 0.717% | 7.170 |
| 11 | WTI Dry Vinegar | 0.100% | 1.000 | 0.100% | 1.000 |
| | Pre-blend oil, gums, flavor and antioxidants | | 0.000 | | 0.000 |
| | Ungerer nat. egg flavor F 14752 | 0.037% | 0.370 | 0.037% | 0.370 |
| | Cargill Clear valley High oleic sunflower oil | 79.500% | 795.000 | 79.500% | 795.000 |
| 12 | Kemin fortium: tocopherols MTD-10 (0.015% of oil); mixed tocoherols | 0.092% | 0.920 | 0.092% | 0.920 |
| | Kemin fortium: Rosemary & green tea extracts RGT12 plus dry (0.2% of product); Rosemary extract & green tea extract | 0.100% | 1.000 | 0.100% | 1.000 |
| 13 | GNT Exberry natural Shade "Celestial yellow" # 474503 | | | | |
| 14 | GNT Exberry natural Shaded "Mango yellow" # 450005 | | | | |
| | add natural colors to match the yellow tint on mayonnaise from the egg yolks | | | | |
| | | 100.000% | 1000.000 | 100.000% | 1000.000 |

1. blend water, vinegar, lemon juice, Quillaja, dry ingredients in a Cuisinart mixer with blade operating at high speed.
2. Slowly add the oil to generate a smooth, creamy emulsion.

*FIG. 4*

| All natural, non-melting cheese and cheese sauces | | | |
|---|---|---|---|
| | solid & semisoft cheeses | cheese sauces | preferred cheese sauce |
| cheese (cheddar, Swiss, etc.) | 97.0% to 99.9% | 25% to 85% | 64.00% |
| Quillaja | 0.1 to 3.0% | 0.1 to 3.0% | 2.00% |
| cream (30% butter fat) | | 0 to 35% | 12.00% |
| unsalted butter | | 0 to 20% | 12.00% |
| water | | 0 to 35% | 10.00% |
| | | | 100.00% |

| All natural, non-melting chocolate | | |
|---|---|---|
| | | preferred |
| Quillaja | 0.1 to 3.0% | 2.00% |
| Chocolate: sugar, cacao beans, cocoa butter, lecithin, vanilla with or without milk added | 99.9% to 97% | 98.00% |

Process:
1. Cheese & sauces:
a. shredded cheese; add Quillaja; blend; heat to ~140 F stirring constantly until cheese has melted and blended completely. Chill to set.
2. cheese sauces:
a. shredded cheese; add Quillaja and water; blend; heat to ~140 F stirring constantly, then add cream and butter. Chill to set.
3. Chocolate: Blend semi-sweet chocolate chips with Quillaja; heat to 105 F to 110 F, stirring constantly until thoroughly blended. Immediately chill to 40 to 70 F to set chocolate.

*FIG. 5*

| All natural, non-separating nut and seed butters (peanut butter, sunflower seed butter, etc.) | | | |
|---|---|---|---|
| | % | % | batch weight |
| | | | 454.00 |
| Quillaja ultra pure NP (0.1% to 10.00% of oil portion) | 0.000% | | |
| Quillaja (2% of oil) | | 1.000% | 4.54 |
| Quillaja is labeled as a natural flavoring | | | 0.00 |
| Adams creamy unsalt peanut butter: | | | 0.00 |
| oil | 50.000% | 49.500% | 224.73 |
| carbohydrates | 187.750% | 18.560% | 84.26 |
| protein | 21.875% | 21.650% | 98.29 |
| water & minerals | 9.375% | 9.290% | 42.18 |
| total | 100.000% | 100.000% | 454.00 |
| Process A. Warm creamy nut butter to 120 F and blend in 1% Quillaja (based on oil) and cool to ambient temperature. | | | |
| Process B: Add 1% Quillaja (based on oil) to nuts or seeds ready to grind; blend to evenly distribute; grind and cool. | | | |

*FIG. 6*

| Heat Stable creamy, fat/oil containing Sauces | | | Example |
|---|---|---|---|
| | Base | | % |
| | | water (5.0% to 99.5%) | 38.800% |
| Desert King | Quillaja ultra Pure NP (0.1% to 10.0% of oil) typically 1% to 2% of the oil | | 1.200% |
| Desert King International, Quillaja Ultra NP, 100% pure Extract of Quillaja | | | |
| | Oil sources (0.1% to 85.0%) | High Stability Algal Oil | 60.000% |
| | | vegetable oils | |
| | | nut & seed oils | |
| | | animal sourced fats & oils | |
| | | | 100.000% |
| 1. blend water and quillaja. | | | |
| 2. VERY Slowly add the oil while blending in a high shear mixer to get an emulsion. | | | |
| 3. This stabilized creamy blend is ready to add to the target base (e.g. creamy soup, creamy sauces, creamy desserts, creamy puddings, etc. | | | |
| 4. Completed formula can be hot filled, retoned, refrigerated or frozen. | | | |

*FIG. 7*

ALL-NATURAL, HEAT AND FREEZE-THAW STABLE MAYONNAISE FOOD PRODUCT

CROSS-REFERENCE TO RELATED APPLICATION

This application claims the benefit under 35 U.S.C. § 119(e) of Provisional U.S. application Ser. No. 62/128,344, filed Mar. 4, 2015, the full disclosure of which is incorporated herein by reference in its entirety for all purposes.

BACKGROUND

Technical Field

The present disclosure is directed to a food composition and, more particularly, to heat-stable sauces, nut butters, and an all-natural dressing-type food, including a food having a taste and consistency of traditional mayonnaise and that is eggless, heat stable, freeze-thaw stable, and has an extended shelf life.

Description of the Related Art

Many sauces are in the form of emulsions, which are a blend or mixture of two or more liquids that are not soluble. One issue with these types of foods is their tendency to demulsify when subjected to heat.

Mayonnaise is a well-known emulsion of oil in lemon juice that has been stabilized by the molecule lecithin found in the egg yolks. It is used as a sauce for foods and is a favored dressing for sandwiches, salads, and other prepared foods as well as an ingredient in numerous recipes for a variety of foods. It is well known that mayonnaise will demulsify when subjected to heat or freezing temperatures, causing the ingredients to separate, resulting in a gooey mess. The key to making mayonnaise is to avoid having the components of the emulsion separate back into their individual components. This is called "turned" or "broken" mayonnaise. No matter how long the oil and lemon juice are mixed together, they will always separate into a gooey mess unless the egg yolk is added as a stabilizer.

The shelf-life of mayonnaise can vary, depending on the ingredients and the conditions under which it is stored. Usually, once opened, mayonnaise needs to be refrigerated to avoid quick spoliation. Heat can cause the emulsion to break down, resulting in a separation of the ingredients, particularly the oil from the lemon juice.

The Food and Drug Administration has promulgated regulations about the contents of mayonnaise at 21 C.F.R. § 169.140. With respect to the use of eggs, the regulation provides in subsection (c) "(c) Egg yolk-containing ingredients. Liquid egg yolks, frozen egg yolks, dried egg yolks, liquid whole eggs, frozen whole eggs, dried whole eggs, or any one or more of the foregoing ingredients listed in this paragraph with liquid egg white or frozen egg white."

Because of concerns about cholesterol, and to accommodate vegan diets, an egg-free type of dressing has been developed with a taste similar to mayonnaise. A popular substitute for the eggs is coconut oil. Because the eggs are omitted from the ingredients, the dressing can no longer be called "mayonnaise" under the federal regulations.

BRIEF SUMMARY

The present disclosed embodiments are directed to an all-natural dressing-type food.

In accordance with one aspect of the present disclosure, a heat stable nut butter, such as peanut butter, is provided that includes an eggless emulsifying extract or flavoring agent.

In accordance with a further aspect of the present disclosure, a food composition is provided that has a taste and consistency of traditional mayonnaise and that is eggless, heat stable, and has an extended shelf life. Ideally the composition is all natural, meaning it does not have the EDTA found in most mayonnaise. An extract is provided that is eggless, all natural, and acts as an emulsifier. In accordance with one aspect of the present disclosure, the extract Quillaja is added to traditional mayonnaise to increase heat stability.

In accordance with another aspect of the present disclosure, a food composition is provided that includes 10% to 25% water, 0.1% to 8% natural flavoring, 0.01% to 12% white vinegar, 0.05% to 12% lemon juice, 0.1% to 20% gluconic acid, 0.1% to 2.5% salt, 0.1% to 5% sugar, and 0.05% to 2.0% mustard flour. The composition further includes a pre-blend of 0.01% to 1.0% natural egg flavor F 14752, 60% to 85% high oleic sunflower oil, and 0.01% to 0.3% RGT 12 Plus Dry. The water, Quillaja, and dry ingredients are blended in a high shear mixer. The pre-blended oil ingredients are then added very slowly, preferably with the blending at high speed, to obtain the emulsion.

In accordance with another aspect of the present disclosure, an all-natural mayonnaise, such as a mayonnaise that is heat stable, is provided that includes 11.781% to 13.781% water, 1.0% Quillaja, 0.069% white vinegar (50 grain), 0.092% lemon juice, 0.825% salt, 1.468% sugar, 0.119% mustard flour, and 0.917% gluconic acid. A pre-blend oil flavor and natural anti-oxidants is also provided that includes 0.037% natural egg flavor (F 14752), 79.5% high oleic sunflower oil, 0.092% MTD-10 (0.015% of oil), 0.1% RGT12 Plus Dry (0.2% of product), 0.1% to 0.3% CaEDTA, and 4.0% whole eggs. Alternatively, 2.0% egg yolks can be substituted for the whole eggs. "MTD-10" contains mixed tocopherols, which are plant-based extracts commercially available under the FORTIUM® line from Kemin Industries, Inc. (Des Moines, Iowa, USA). Commercial tocopherols may be in a diluted form, e.g., in oil at a concentration of 0.015%. "RGT12" or "RGT 12 Plus Dry" contains rosemary and green tea extracts, also commercially available under the FORTIUM® line from Kemin Industries, Inc.

The process includes blending the water, Quillaja, and dry ingredients in a mixer (such as a Cuisinart® mixer with blade). The oil is added very slowly to obtain the emulsion. This blend is then placed in the Cuisinart® with the blade and run at high speed to make the emulsion smooth.

In accordance with another aspect of the foregoing disclosure, an eggless mayo can be provided by changing the water to 15.781% and eliminating the eggs and the 0.1% to 0.3% CaEDTA.

In accordance with yet another aspect of the present disclosure, the mayonnaise composition above can be made to take a freeze-thaw without turning to liquid by adding a combination of these natural gums: gum Arabic, guar and Xanthan gum. The mayo composition is then nicely freeze-thaw stable and holds its texture. When added to a food as an ingredient, it adds a slight amount of viscosity. Preferably this is added at 0.3% of the blend: 50% gum Arabic, 30% guar gum and 20% Xanthan gum. The range can be 0.01% to 1.0%.

In accordance with another aspect of the present disclosure, an all-natural, non-separating nut butter is provided that includes 1% by weight of Quillaja, and nut butter that includes 49.5% oil, 18.56% carbohydrates, 21.65% protein, and 9.29% water and minerals. The nut butter is heated to 120° F. and the Quillaja is blended in, and then allowed to cool to ambient temperature. Alternatively, the Quillaja (based on oil) is added to nuts or seeds that are ready to grind, and then these are blended to evenly distribute, then grind and cool.

In accordance with another aspect of the present disclosure, a heat stable creamy, fat or oil containing sauce is provided that includes 38.8% water, 1.2% Quillaja, and 60% oil such as high stability Algal oil, vegetable oils, nut and seed oils, and animal sourced fat and oils. The water and Quillaja are blended, and then the oil is slowly added while blending in a high shear mixer to obtain an emulsion. This stabilized creamy blend is ready to add to a target base, such as a creamy soup, creamy sauce, creamy dessert, creamy pudding, and the like. The completed formula can be hot filled, retorted, refrigerated or frozen.

In accordance with another aspect of the present disclosure, an all-natural, non-melting cheese is provided that includes 97.0% to 99.9% cheese, such as cheddar, Swiss, American, and 0.1% to 3.0% Quillaja. The process involves shredding the cheese, adding the Quillaja, blending, and then heating to about 140° F. while stirring occasionally until the cheese has melted and blended completely, then chill to set.

In accordance with another aspect of the present disclosure, a cheese sauce is provided that includes 25% to 85% with a preferred amount at 64% of cheese, 0.1% to 3.0% and preferably 2.0% of Quillaja, 0% to 35% and preferably 12% cream (30% butter fat), 0% to 20% and preferably 12% unsalted butter, and 0% to 35%, and preferably 10.0% water. The cheese is shredded and Quillaja added with water and blended. The blend is heated to about 140° F. while stirring constantly, and then cream and butter is added and the blend is chilled to set.

In accordance with still yet a further aspect of the present disclosure, an all-natural, non-melting chocolate is provided that includes 0.1% to 3.0% and preferably 2.0% Quillaja, and 99.9% to 97% and preferably 98% collocate, such as sugar, cacao beans, cocoa butter, lecithin, vanilla with or without added milk. The process includes blending semi-sweet chocolate chips with Quillaja, heating to 105° F. to 110° F. while stirring constantly until thoroughly blended. Immediately chill to 40° F. to 70° F. to set the chocolate.

BRIEF DESCRIPTION OF THE DRAWINGS

The foregoing and other features and advantages of the present disclosure will be more readily appreciated as the same become better understood from the following detailed description when taken in conjunction with the accompanying drawings, wherein:

FIGS. 1A and 1B represent a table for four eggless mayo compositions and a butter spread composition;

FIG. 2 is a table of four mayonnaise compositions that are heat stable and all natural, and that are heat stable as well as freeze-thaw stable;

FIG. 3 is a table of two eggless mayo compositions that are an alternative to the compositions of FIG. 1;

FIG. 4 is a table of two compositions of heat stable and all natural eggless mayo that achieve a 50% reduction in sodium;

FIG. 5 is a table for all-natural, non-melting cheese, cheese sauces, and all-natural, non-melting chocolate;

FIG. 6 is a table for all-natural, non-separating nut and seed butters; and

FIG. 7 is a table for heat stable cream, fat or oil containing sauces.

DETAILED DESCRIPTION

In the following description, certain specific details are set forth in order to provide a thorough understanding of various embodiments of the present disclosure. However, one skilled in the art will understand that the disclosure may be practiced without one or more of these specific details. In other instances, well-known aspects of food products and methods of producing food products such as pies, wraps, burritos, soft-shell tacos, pastry-like shells, and the like have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Values recited in this specification as a "range" are intended to include the end values noted therein. When values are described as "between" two end values, the end values in this case are intended to be included unless stated otherwise.

Unless specified otherwise, the percentage or percentage range of a given component in a given food product described herein is by weight.

An all-natural mayonnaise is provided that includes 10% to 25% water, 0.1% to 8% natural or Quillaja flavoring, 0.01% to 12% white vinegar, 0.05% to 12% lemon juice, 0.1% to 20% gluconic acid, 0.1% to 2.5% salt, 0.1% to 5% sugar, and 0.05% to 2.0% mustard flour. The composition further includes a pre-blend of 0.01% to 1.0% natural egg flavor F 14752, 60% to 85% high oleic sunflower oil, 0.01% to 0.3% RGT 12 Plus Dry. The water, Quillaja, and dry ingredients are blended in a high shear mixer. The pre-blended oil ingredients are then added very slowly, preferably at a high blending speed, to obtain the emulsion.

It is to be understood throughout this description that while high oleic sunflower oil is preferred, any oil of plant or animal origin can be used. The most used oils in mayonnaise are soybean oil, canola oil, safflower oil, peanut oil, corn oil, olive oil, but there are many others (avocado, algae) that can be used in the compositions of the present disclosure. More particularly, the oils fall into several classes: vegetable (canola, soybean, corn, avocado, etc.), nuts (peanut, coconut, walnut, almond, hazelnut, etc.), seeds (pumpkin, sunflower, cottonseed, sesame seed, etc.), animal (butterfat, lard, tallow, etc.), algal oil, and fish oils.

It is to be further understood that the sugar can be substituted with any sweetener like agave nectar, which is described further herein, as well as honey, high fructose corn syrup, and fruit concentrates.

Ideally the natural flavoring is Quillaja, which is approved by the FDA for human consumption. It is available from Desert King International located in San Diego, Calif., USA.

Referring next to FIG. 1, shown therein is a table for both an all-natural mayonnaise with an added extract and for an all-natural eggless mayo formed in accordance with the present disclosure. Also the products disclosed herein can be made with one or a variety of acidulants. Besides vinegar or acetic acid, one could use gluconic acid, lemon juice, citric acid, as well as lactic acid or malic acid.

Referring to column A, Eggless version, a heat stable formulation or composition is provided to include water that is distilled, having no minerals, at 15.781%; Quillaja natural flavor at 1.0%; white vinegar (50 grain) at 0.069%; lemon juice, natural strength, and all natural 0.092%; salt at 0.825%; sugar at 1.468%; mustard flour at 0.119%; gluconic acid (50%) at 0.917%; and a pre-blend of oil, gums, flavor and antioxidants that include natural egg flavor F14752 at 0.037%; high oleic sunflower oil at 79.5%; MTD-10 (0.015% of oil) at 0.092%; and RGT12 Plus Dry (0.2% of product) at 0.10%. Ideally this is aerated with nitrogen to improve spreadability. The water, Quillaja, and dry ingredients are blended in a high shear mixer. The pre-blended oil ingredients are then added very slowly to obtain the emulsion.

This Eggless version can be improved as shown in column B to remain all natural and be heat stable and freeze-thaw stable using the following composition: water that is distilled, having no minerals, at 14.556%; Ticaloid 1155 (gum Arabic/guar/Xanthan Gum 0.2% to 0.4%) at 0.300%; Quillaja natural flavor at 1.0%; white vinegar (50 grain) at 0.069%; lemon juice, natural strength, and all natural 0.092%; salt at 0.825%; sea salt #68 at 0.825%; sugar at 1.468%; mustard flour at 0.119%; gluconic acid (50%) at 0.917%; dry vinegar and a pre-blend of oil, gums, flavor and antioxidants that include natural egg flavor F14752 at 0.037%; high oleic sunflower oil at 79.5%; MTD-10 (0.015% of oil) at 0.092%; and RGT12 Plus Dry (0.2% of product) at 0.10%. Ideally this is aerated with nitrogen to improve spreadability. The water, Quillaja, and dry ingredients are blended in a high shear mixer. The pre-blended oil ingredients are then added very slowly, preferably at a high blending speed, to obtain the emulsion.

Column C shows a further composition for improved eggless mayo in which the foregoing composition of column B is altered by reducing the water to 13.864%, removing the sugar, and using Agave Premium Syrup (South Africa), very bland—70 Brix, at 2.160%.

The last two columns of FIG. 1 are labeled "butter spread," and include ingredients very similar to column C except the high oleic sunflower oil is replaced with clarified butter/ghee (fresh pasteurized cream) at 79.5%.

Turning next to FIG. 2, for an all-natural mayonnaise that is heat stable, the compositions in columns MA and MB are provided. In columns MA and MB are found a heat stable Mayonnaise (egg) that has the following ingredients: 11.781% to 13.781% water that is distilled (no minerals), respectively, 1.0% Quillaja, 0.069% white vinegar (50 grain), 0.092% lemon juice, 0.825% salt, 1.468% sugar, 0.119% mustard flour, and 0.917% gluconic acid. A pre-blend of oil flavor and natural anti-oxidants is also provided that includes 0.037% natural egg flavor (F 14752), 79.5% high oleic sunflower oil, 0.092% MTD-10 (0.015% of oil), 0.1% RGT12 Plus Dry (0.2% of product). Column MA includes 4.0% whole eggs and 0.007% Ca EDTA (75 ppm). Alternatively, 2.0% egg yolks can be substituted for the whole eggs as shown in column MB. The process includes blending the water, Quillaja, and dry ingredients in a mixer (such as a Cuisinart® mixer with blade operating at high speed). The oil is added very slowly to obtain the emulsion. This blend is run at high speed to make the emulsion smooth.

An eggless mayo can be provided by changing the water to 15.781% and eliminating the eggs and the 0.007% CaEDTA, similar to the "Eggless A version" of FIG. 1.

The mayonnaise composition above can be made to take a freeze-thaw without turning to liquid by adding a combination of these natural gums as shown in columns MAF and MBF in FIG. 2. In particular, gum Arabic, guar and Xanthan gum are added to achieve a freeze-thaw stable product that holds its texture. When added, it adds a slight amount of viscosity. Preferably this is added at 0.3% of the blend: 50% gum Arabic, 30% guar gum and 20% Xanthan gum. The range can be 0.01% to 1.0% and more preferably 0.2% to 0.4%. In column MAF the water is at 11.481% and whole eggs are used. In column MBF the water is 13.481% and egg yolks at 2.0% are used.

FIG. 3 illustrates an all-natural eggless mayo that is heat stable, which is an alternative to the compositions of FIG. 1. In column C-2, the ingredients include water that is distilled, having no minerals, at 13.014%; Ticaloid 1155 (gum Arabic/guar/Xanthan Gum 0.2% to 0.4%) at 0.300%; Quillaja natural flavor at 1.0%; white vinegar (50 grain) at 2.569%; lemon juice, natural strength, and all natural 0.092%; salt at 0.625%; sea salt #68 at 0.625%; Agave Premium Syrup (South African), very bland at 2.160%; mustard flour at 0.119%; gluconic acid (50%) at 0.717%; RGT12 Plus Dry (0.2% of product) at 0.10%; dry vinegar at 0.050%; and a pre-blend of oil, gums, flavor and antioxidants that include natural egg flavor F14752 at 0.037%; high oleic sunflower oil at 78.5%; and MTD-10 (0.015% of oil) at 0.092%. This is processed by blending water, vinegar, lemon juice, Quillaja, dry ingredients in a Cuisinart® mixer with blade operating at a high speed, then slowly adding the oil to generate a smooth, creamy emulsion.

Batch E is a lower salt version of column C-2 in which the water is 13.714%, the Ticaloid is at 0.200%, the salt is at 0.325%, and the sea salt is at 0.325%.

FIG. 4 is an improved eggless mayo that is all natural and heat stable. Here, the ingredients are water that is distilled, having no minerals, at 15.156%; Ticaloid 1155 (gum Arabic/guar/Xanthan Gum 0.2% to 0.4%) at 0.300%; Quillaja natural flavor at 1.0%; white vinegar (50 grain) at 0.069%; lemon juice, natural strength, and all natural 0.092%; salt at 0.625%; sea salt #68 at 0.625%; sugar at 1.468%; mustard flour at 0.119%; gluconic acid (50%) at 0.717%; dry vinegar at 0.100%; and a pre-blend of oil, gums, flavor and antioxidants that include natural egg flavor F14752 at 0.037%; high oleic sunflower oil at 79.5%; MTD-10 (0.015% of oil) at 0.092%; and RGT12 Plus Dry (0.2% of product) at 0.10%. This is processed by blending water, vinegar, lemon juice, Quillaja, dry ingredients in a Cuisinart® mixer with blade operating at a high speed, then slowly adding the oil to generate a smooth, creamy emulsion.

Column C is similar to column B except the water is reduced to 14.464%, and Agave Premium Syrup at 2.160% is used instead of the sugar. The compositions in FIG. 4 achieve a heat stable, freeze-thaw stable all-natural product with a sodium reduction of 50%.

Turning next to FIG. 5, shown therein is a table for an all-natural, non-melting cheese (solid or semi-soft) that includes 97.0% to 99.9% cheese, such as cheddar, Swiss, American, and 0.1% to 3.0% Quillaja. The process involves shredding the cheese, adding the Quillaja, blending, and then heating to about 140° F. while stirring occasionally until cheese has melted and blended completely, then chill to set.

FIG. 5 also shows a cheese sauce that includes 25% to 85% with a preferred amount at 64% of cheese, 0.1% to 3.0% and preferably 2.0% of Quillaja, 0% to 35% and preferably 12% cream (30% butter fat), 0% to 20% and preferably 12% unsalted butter, and 0% to 35%, and preferably 10.0% water. The cheese is shredded and Quillaja added with water and blended. The blend is heated to about 140° F. while stirring constantly, and then add cream and butter. Chill to set.

And FIG. 5 shows the ingredients and process for an all-natural, non-melting chocolate that includes 0.1% to 3.0% and preferably 2.0% Quillaja, and 99.9% to 97% and preferably 98% collocate, such as sugar, cacao beans, cocoa butter, lecithin, vanilla with or without added milk. The process includes blending semi-sweet chocolate chips with Quillaja, heating to 105° F. to 110° F. while stirring constantly until thoroughly blended. Immediately chill to 40° F. to 70° F. to set the chocolate.

Turing next to FIG. 6, an all-natural, non-separating nut butter is provided that includes 1% by weight of Quillaja, and nut butter that includes 49.5% oil, 18.56% carbohydrates, 21.65% protein, and 9.29% water and minerals. The nut butter is heated to 120° F. and the Quillaja is blended in, and then allowed to cool to ambient temperature. Alternatively, the Quillaja (based on oil) is added to nuts or seeds that are ready to grind, and then these are blended to evenly distribute, then ground and cooled.

FIG. 7 is table for a heat stable creamy, fat or oil containing sauce that includes 38.8% water, 1.2% Quillaja, and 60% oil such as high stability Algal oil, vegetable oils, nut and seed oils, and animal sourced fat and oils. The water and Quillaja are blended, and then the oil is slowly added while blending in a high shear mixer to obtain an emulsion. This stabilized creamy blend is ready to add to a target base, such as a creamy soup, creamy sauce, creamy dessert, creamy pudding, and the like. The completed formula can be hot filled, retorted, refrigerated or frozen.

Quillaja can be used to make natural oil soluble flavors, oil soluble spices extracts (essentials oils and oleoresins), water soluble for easy dispersion and making these flavor additions all natural. These flavors are now being made water soluble using polysorbate 80. Quillaja use level is 0.1% to 50.0% because the FDA limits emulsifier use in these formulas to 50%. The levels for a natural oil flavor extract, natural spice extract (essential oils, oleoresins) are: 99.9% to 50.00%.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference in their entirety. Aspects of the embodiments can be modified, if necessary to employ concepts of the various patents, applications and publications to provide yet further embodiments.

The invention claimed is:

1. An all-natural mayonnaise food product, consisting of, by weight,
   10% to 25% water,
   0.1% to 8% natural flavoring,
   0.01% to 12% white vinegar,
   0.05% to 12% lemon juice,
   0.1% to 20% gluconic acid,
   0.1% to 2.5% salt,
   0.1% to 5% sugar, and
   0.05% to 2.0% mustard flour,
   a natural gum or gum blend, and
   a pre-blend consisting of, by weight of the all-natural mayonnaise food product, 0.01% to 1.0% natural egg flavor, 60% to 85% high oleic sunflower oil, 0.01% to 0.3% rosemary and green tea extracts, and plant extracts containing tocopherols and eggs,
   wherein the all-natural mayonnaise food product is heat and freeze-thaw stable.

2. The food product of claim 1, wherein the gum or gum blend consisting of, 0.01% to 1.0% by weight of the all-natural mayonnaise food product including one or more natural gums selected from the group consisting of gum Arabic, guar, Xanthan gum and combinations thereof.

3. The food product of claim 2 wherein the gum blend consisting of, by weight of the gum blend, 50% gum Arabic, 30% guar gum and 20% Xanthan gum.

4. The food product of claim 1, consisting of, by weight, 11.00-14.00% water, 1.0% Quillaja as the natural flavoring, 0.07% white vinegar, 0.09-0.10% lemon juice, 0.80-0.90% salt, 1.40-1.50% sugar, 0.10-0.12% mustard flour, 0.90-1.00% gluconic acid; and wherein the pre-blend consisting of, by weight of the all-natural mayonnaise food product, 0.03-0.04% natural egg flavor, 79.0-80.0% high oleic sunflower oil, 0.09-0.10% plant extracts containing tocopherols, 0.10% rosemary and green tea extracts, and 2% to 4% eggs.

5. The food product of claim 4, consisting of, by weight, 11.781% to 13.781% water, 1.0% Quillaja, 0.069% white vinegar, 0.092% lemon juice, 0.825% salt, 1.468% sugar, 0.119% mustard flour, 0.917% gluconic acid; and
wherein the pre-blend consisting of, by weight of the all-natural mayonnaise food product,
   0.037% natural egg flavor,
   79.5% high oleic sunflower oil,
   0.092% plant extracts containing 0.015% tocopherols,
   0.1% rosemary and green tea extracts, and
   2% to 4% eggs.

6. The food product of claim 4, wherein the pre-blend consisting of, by weight of the all-natural mayonnaise food product, 4% whole eggs or 2.0% egg yolks.

7. The food product of claim 1, consisting of, by weight, 15.781% water, 1.0% Quillaja as the natural flavoring, 0.069% white vinegar, 0.092% lemon juice, 0.825% salt, 1.468% sugar, 0.119% mustard flour, 0.917% gluconic acid; and wherein the pre-blend consisting of, by weight of the all-natural mayonnaise food product,
   0.037% natural egg flavor,
   79.5% high oleic sunflower oil,
   0.092% plant extracts containing 0.015% tocopherols, and
   0.1% rosemary and green tea extracts.

8. The food product of claim 1 wherein the natural flavoring is Quillaja.

9. A food product, consisting of a mayonnaise, by weight:
   10% to 25% water,
   0.1% to 8% natural flavoring,
   0.01% to 12% white vinegar,
   0.05% to 12% lemon juice,
   0.1% to 20% gluconic acid,
   0.1% to 2.5% salt,
   0.1% to 5% sugar, and
   0.05% to 2.0% mustard flour;
   0.01% to 1.0% natural egg flavor,
   60% to 85% high oleic sunflower oil, and
   0.01% to 0.3% rosemary and green tea extracts, wherein the food product is an all-natural mayonnaise that is heat and freeze-thaw stable.

* * * * *